US006202665B1

(12) United States Patent
O'Hare

(10) Patent No.: US 6,202,665 B1
(45) Date of Patent: Mar. 20, 2001

(54) UNIVERSAL PORTABLE HUNTING BLIND

(76) Inventor: Daniel P. O'Hare, 1 Princeton Ave., Fort Mitchell, KY (US) 41017

( * ) Notice: Subject to any disclaimer, the term of this patent is extended or adjusted under 35 U.S.C. 154(b) by 0 days.

(21) Appl. No.: 09/388,655

(22) Filed: Sep. 2, 1999

(51) Int. Cl.[7] ................................................. E04H 15/04
(52) U.S. Cl. ............................................. 135/90; 135/901
(58) Field of Search ............................. 135/90, 136, 117, 135/901, 906; 108/152; 297/184

(56) References Cited

U.S. PATENT DOCUMENTS

| 2,543,597 | * | 2/1951 | Peery | 135/906 |
| 3,116,808 | * | 1/1964 | Riley | 135/90 |
| 3,622,201 | * | 11/1971 | Radig | 135/906 |
| 3,856,029 | * | 12/1974 | Huddle | 135/906 |
| 3,868,155 | * | 2/1975 | Cherubini | 135/906 |
| 4,966,181 | * | 10/1990 | Liberman et al. | 135/902 |
| 5,613,512 | * | 3/1997 | Bean | 135/90 |
| 5,669,403 | * | 9/1997 | Belcher et al. | 135/901 |
| 5,803,694 | * | 9/1998 | Steele | 135/901 |

* cited by examiner

Primary Examiner—Peter M. Cuomo
Assistant Examiner—Gerald A. Anderson
(74) Attorney, Agent, or Firm—Wood, Herron & Evans LLP

(57) ABSTRACT

A portable hunting blind for retrofitting to hunter's tree stands features arch-shaped concealment panels comprising a reconfigurable camouflage material attached via flexible rods to a lightweight support base. At the points of attachment to the support base, elbows permit the concealment panels to be variably inclined so that the enclosure size and the width of any openings can be varied. Options include a pouch to store hunting gear, an arrow quiver to store hunting arrows, a sheet of camouflage material to seal an opening between adjacent panels, and a ground stake to convert the invention to a ground blind.

14 Claims, 6 Drawing Sheets

UNIVERSAL PORTABLE HUNTING BLIND

FIELD OF THE INVENTION

The present invention relates to a lightweight, portable hunting blind that mounts to a tree stand for use as an elevated hunting blind or to ground stakes for use as a ground hunting blind.

BACKGROUND OF THE INVENTION

Hunters and other wildlife observers conceal bodily movement from the vision of observant quarry, such as deer or turkey with a hunting blind. A typical hunting blind comprises a frame covered by concealment panels of a camouflage material. The pattern of the camouflage material is chosen to blend with the natural surroundings. Since the camouflage material is usually opaque or only slightly "open" (such as by leafy-shaped cut outs or patterns in a see-through material), a hunter can move within the enclosure created by the hunting blind without alerting nearby quarry to potential danger by reason of that movement.

A tree stand enhances a hunter's field-of-view and reduces risk of detection by a game animal. A tree stand may be used to climb a tree, or is otherwise mounted thereon, and is thus temporarily attached to a trunk of a tree at a predetermined height above ground level. To further disguise presence in the tree stand from vigilant quarry, a hunter often wears clothing with a camouflage pattern that blends with the immediate surroundings. Although garbed in camouflage, the hunter normally remains in plain view while positioned in the tree stand. As a result, vigilant quarry can still detect the exposed movements by the hunter. If a tree stand also incorporates a hunting blind, the movements are consequently obscured. Therefore, the effectiveness of a tree stand is enhanced by the addition of a blind combined with it.

Several patents in the prior art disclose hunting blinds for use with a tree stand. However, each has certain inherent problems. For example, U.S. Pat. No. 5,613,512 to Bean discloses a hunting blind for use with a tree stand that employs a single panel that completely wraps around the platform of the tree stand. The panel is mounted on a dual-beam base at a predetermined angle of inclination on rods received by pivoting sockets in close proximity to the platform. As disclosed, that hunting blind obstructs the near-field vision of the ground by the occupant and becomes totally ineffective for concealment when the occupant exposes his body to aim and fire his weapon.

It is thus desirable to provide a hunting blind for use with a tree stand which permits the size of the concealed enclosure and the orientation of the concealment panel(s) to be varied, allows an unobstructed line-of-sight for aiming and discharging a firearm or a bow while sustaining peripheral concealment, permits easy transport to the hunting site, and easily adapts to changing natural environments.

It is well-known to use a ground blind to artificially create a concealed position when a hunter hunts at ground level. Otherwise, the hunter must rely upon natural camouflage, such as bushes and high grass. However, ground blinds usually incorporate small flapped openings or the like through which the hunter must look to spot game and to fire his weapon.

It is desirable to provide a ground blind with open lines of sight for aiming and discharging a weapon, that allows the size of the concealed area to be varied with ease, that permits easy transport to the hunting site, and that easily adapts to changing natural environments.

It is a principle object of the present invention to provide an improved hunting or observation blind that may be attached to a tree stand or used in another application as a ground blind.

It is another object of the invention to provide a hunting blind that can be quickly and easily assembled without tools.

It is another object of the invention to provide a hunting blind that can be retrofitted on most commercial tree stands.

It is another object of the invention to provide a lightweight and compact hunting blind that is portable in the field.

It is another object of the invention to provide a hunting blind that conceals the occupant from lateral detection at all times but affords a substantially unobstructed frontal shooting lane.

It is another object of the invention to provide a hunting blind with concealment panels that can be reconfigured to match changing natural surroundings.

SUMMARY OF THE INVENTION

The present invention contemplates a portable hunting or observation blind that can be retrofitted to most commercial tree stands or adapted to create a ground blind, is easy to transport to and from the hunting site, and does not add significant weight to a tree stand. The portable hunting blind is modular, compact and easy to assemble and disassemble in the field.

When applied to use with a tree stand, the portable hunting blind according to the present invention generally includes a support base and at least one wing-shaped, or arched, concealment panel. Each concealment panel is removably and pivotally attached to the support base to create concealment for a hunter or observer. The support base generally includes at least a pair, if not more, of interconnected support beams which can be removably fastened to most commercial tree stands by means of any suitable fasteners, such as a plurality of reusable, flexible cable ties.

Extension arms are disposed in the free ends of each support beam. When an extension arm is extended, the corresponding support beam is lengthened. When an extension arm is retracted or removed, the footprint of the hunting blind is reduced to facilitate carrying, climbing, and hanging the hunting stand/tree blind combination in a tree.

Each concealment panel includes and is mounted to the support base by adjustable elbows disposed at the exposed, peripheral ends of the extension arms. As the elbow is bent through its range of motion, the occupant of the hunting blind can incline each wing-shaped concealment panel in an angular position relative to the horizontal plane formed by the support base.

Each concealment panel generally comprises a flexible, elongated support rod and a panel cover of concealment material preferably of a camouflage pattern of solid, opaque material, open weave or non-weave or cut out in a leafy or natural pattern. The support rod is preferably composed of segments of plastic composite tubing shock-corded together in known fashion and foldable to compact the overall length for carrying. Tube segments are joined via metal ferrules to create a single, flexible support rod.

Each panel cover includes a series of one or more sleeves, disposed about its periphery. A support rod is threaded through all, or less than all of the sleeves. Opposing ends of the support rod are disposed in the elbows, which are properly positioned to receive the support rod at the desired inclination and to define points of attachment to bend the rod into an arch shape. The combination of rod and covering in this way produces a wing-shaped or inverted, U-shaped or arch-shaped or other shaped concealment panel.

In the preferred embodiment in combination with a tree stand, two concealment panels are removably attached to the support base at the peripheral end of each extension arm. An enclosure for an occupant is defined by the planes of the two adjustable concealment panels and the tree. The separation between the concealment panels is greater near the tree trunk to accommodate the observer's body and narrows with increasing distance from the tree trunk. Between the two concealment panels, at their forward edges, an opening is formed which diverges upwardly as a result of their arched shape. This affords the occupant an unobstructed forward line of sight, yet limits the visibility of his motion from the ground, both from the sides and from the front.

Accessories are available to augment the functionality of the portable hunting blind. An optional front skirt can be fastened along the forward edges of two adjacent concealment panels to fill the front opening for yet further concealment. An optional gear pouch can be attached to a concealment panel to store miscellaneous supplies in an easily accessible position. An optional arrow clip can be attached to the gear pouch or an arrow quiver to a concealment panel to safely store hunting arrows for use.

The blind assembly of the invention has a dual use according to the invention. Optional ground stakes are used to convert the portable hunting blind from a tree blind to a ground blind. The ends of the support rods for the concealment panel are inserted into elbows on the stakes and the blind assembly is thus effective to conceal the ground level hunter and at the same time is adjustable, as noted above.

The above and other objects and advantages of the present invention will be apparent from the following detailed written description thereof and from the drawings in which:

DETAILED DESCRIPTION

Figure 1:
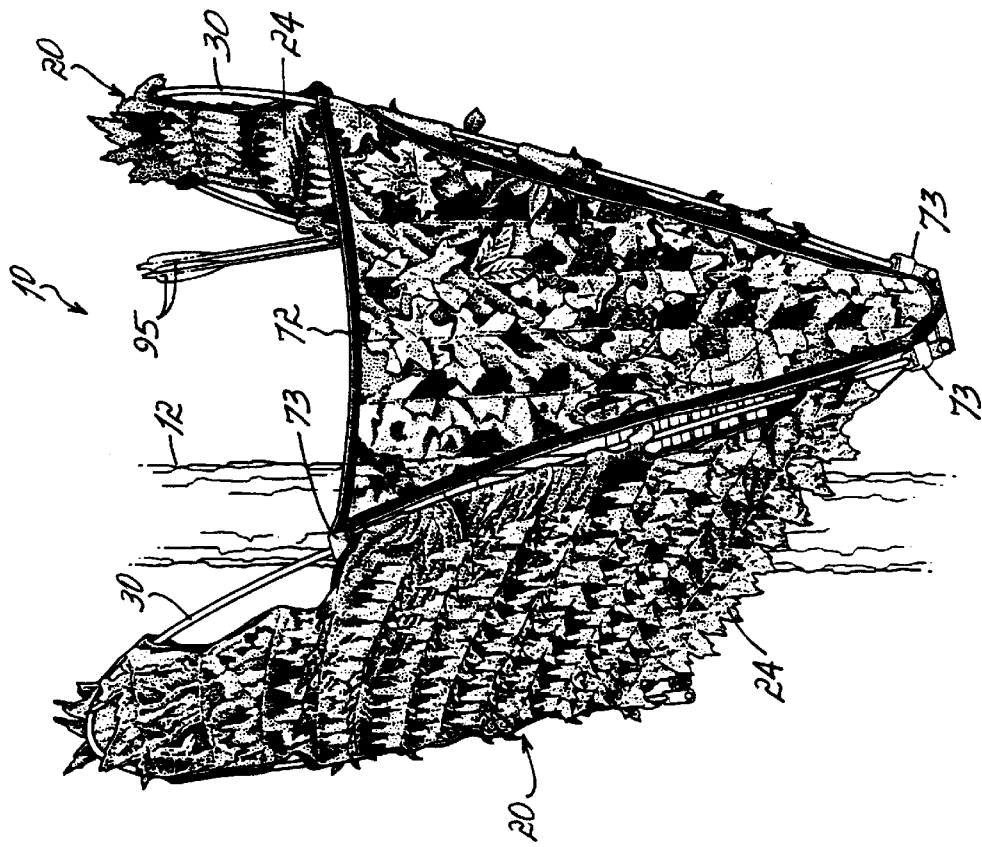
FIG. 1 is a perspective view of a blind according to the invention mounted to a tree stand in a tree.

Referring now to the drawings, a portable hunting blind 10 according to the present invention is shown in FIG. 1, as would be implemented in conjunction with a tree stand 14 consisting of at least a seat 14a and a support member 17. The combination of portable hunting blind 10 and tree stand 14 is commonly attached to the trunk 12 of a tree to define an elevated hunting position.

As shown in FIG. 1, the portable hunting blind 10 includes at least one concealment panel 20 that is comprised of a panel cover 24, an elongated support rod 30 having two opposing ends, and an elbow 38 to support each end. The panel cover 24 is preferably composed of a material incorporating a camouflage pattern. To match the surrounding natural environment, the camouflage pattern of the panel cover 24 is usually opaque or only "slightly open" (such as by leafy-shaped cut-outs or patterns in a see-through material). A plurality of sleeves 22 is sewn on the perimeter of the panel cover 24. The panel covers 24 can be easily changed to match the panel cover to the environment or the season in which the blind is used.

A support rod 30 is threaded through the sleeves 22 of the panel cover 24 and the support rod 30 is bent to form an arch with the interior filled by the now taut panel cover 24. Opposing ends of the support rod 30 are attached to a respective elbow 38, as will be described. In the preferred embodiment, the support rod 30 is constructed of multiple segments of shock-corded tubing which are removably coupled with metal sleeves or ferrules to form a single, flexible rod. Such shock-corded tubes or rods are typically used in other non-related applications, such as in tents, where the rods are flexible or in walking staffs, for example, where the multiple segmented rods are stiff, and as is well known in the art. For this application, the rods are flexible in use to slip in the panel cover sleeves, taking on an arch-like shape.

Concealment panel 20 is preferably positioned to define an inclined plane. In applications that employ two concealment panels 20, the spacing between adjacent concealment panels 20 narrows with increasing distance from the trunk of a tree 12 that supports the associated tree stand 14. An occupant of the portable hunting blind 10 is afforded an unobstructed frontal line-of-sight, from a position between adjacent concealment panels 20, through the upwardly diverging space an opening between the forward edges of the respective panels 20, yet the occupant is concealed laterally from the vision of any quarry on the ground. To add structural integrity to each concealment panel 20, elastic cords 56 connect grommets 58 in the panel covering 24 to a support base 61.

An optional arrow quiver 90, for safe storage of hunting arrows 95, is shown attached to one concealment panel 20. It is hung on the panel by an appropriate means such as cords 94 attached to the panel edge defined by rod 30 or by other fastening devices.

Figure 2:
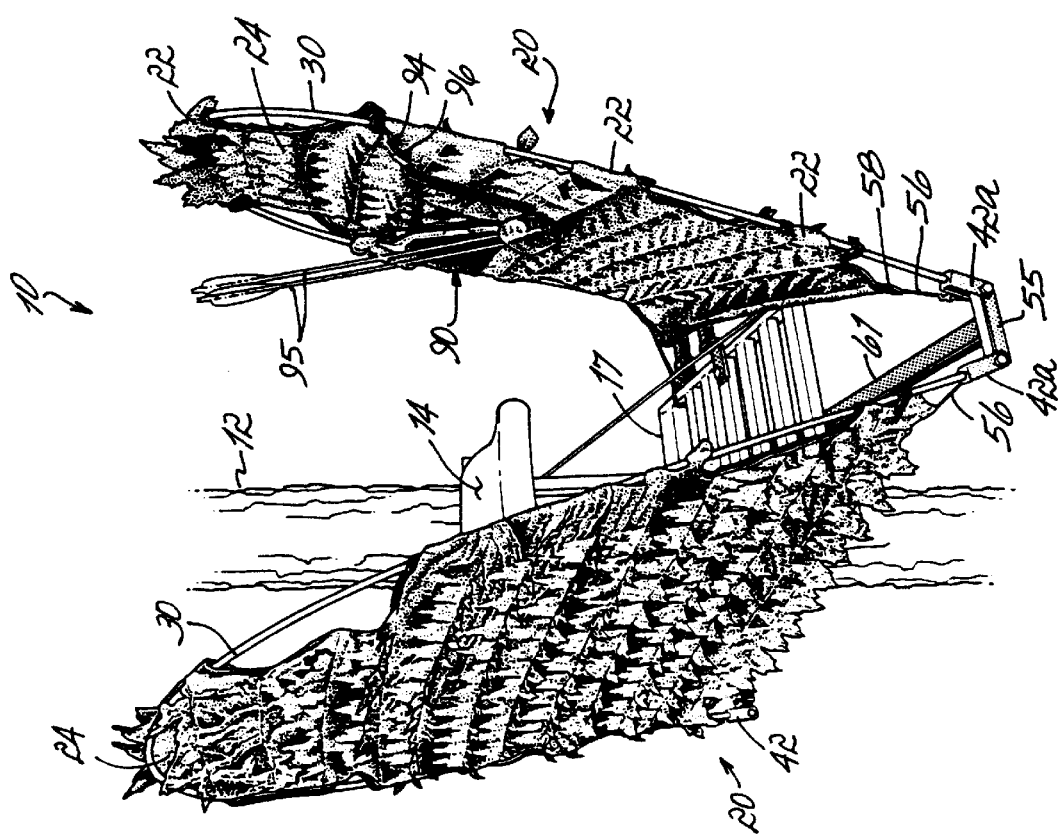
FIG. 2 is a perspective view of the present invention of FIG. 1 with an optional front skirt attached.

FIG. 2 shows the portable hunting blind 10 with an optional front skirt 72. To complete the enclosure, each side of the wedge-shaped front skirt 72 fastens to a concealment panel 20 and fills the void between adjacent concealment panels 20. When attached with fasteners 73, the front skirt 72 adds concealment but partially obscures an observer's line-of-sight for objects positioned near the base of the trunk of a tree 12 to which the associated tree stand 14 is attached.

Figure 3:
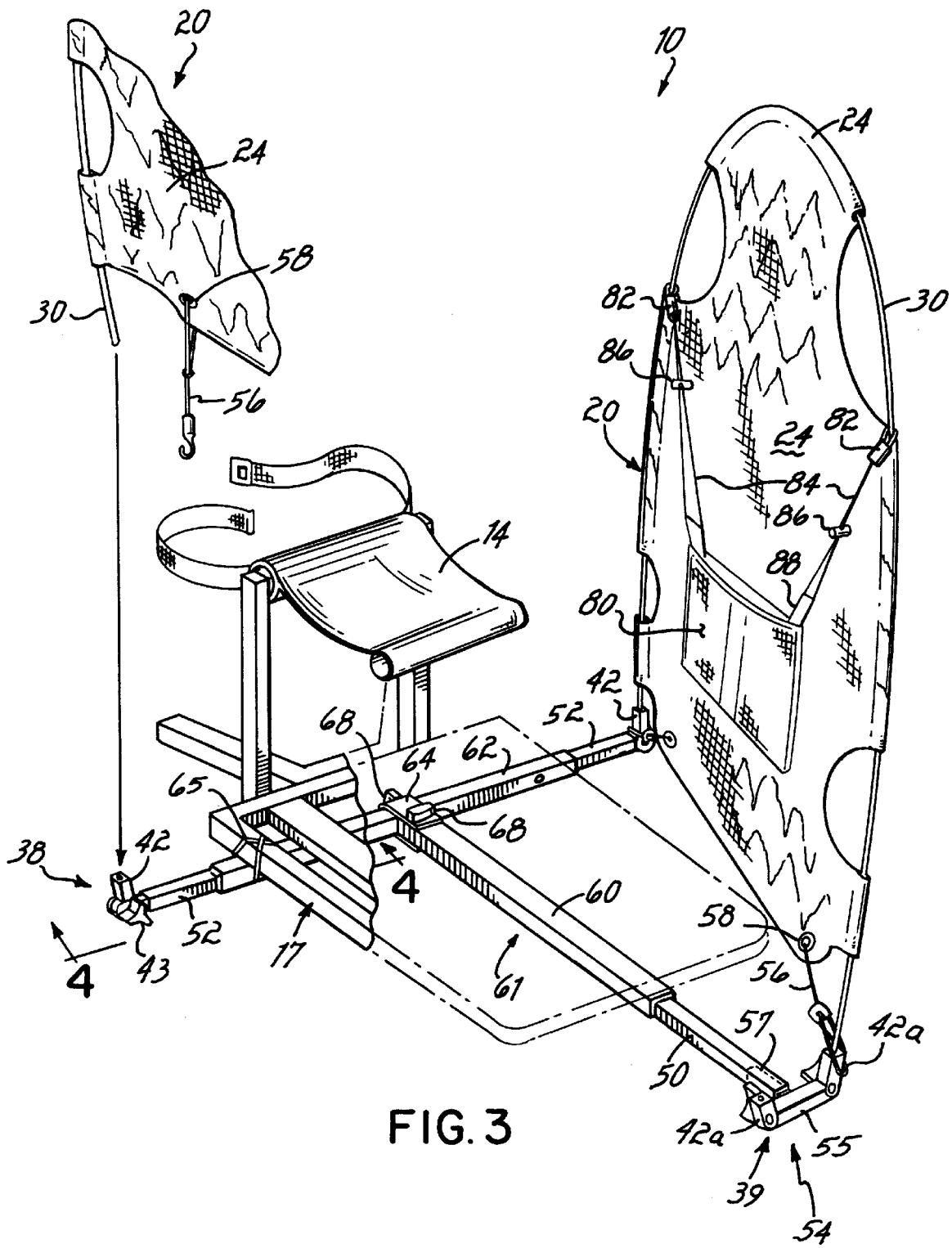
FIG. 3 is an expanded view of the present invention with elements of the tree stand platform shown to illustrate the combination of the support base of the present invention with the tree stand.

A support base 61 that forms a pedestal for the concealment panels 20 of a portable hunting blind 10 is shown in FIG. 3. As configured as a tree blind base, a longitudinal support beam 60 is perpendicularly joined to the mid-point of a transverse support beam 62 by a bracket 64. When the openings are aligned, a carriage bolt (not shown) extends through aligned openings in the bracket 64 and the support beams 60, 62. The carriage bolt is secured using a finger-adjustable wing nut 68 for easy assembly. Since the support base 61 is not load-bearing with respect to the tree-stand or hunter, it is preferably fabricated from a lightweight material. In the preferred embodiment, the longitudinal support beam 60 and transverse support beam 62 are constructed of thin5 walled polymer tubing having a square cross-section. It should be understood that the support base 61 can include more than two interconnected support beams.

Figure 4:
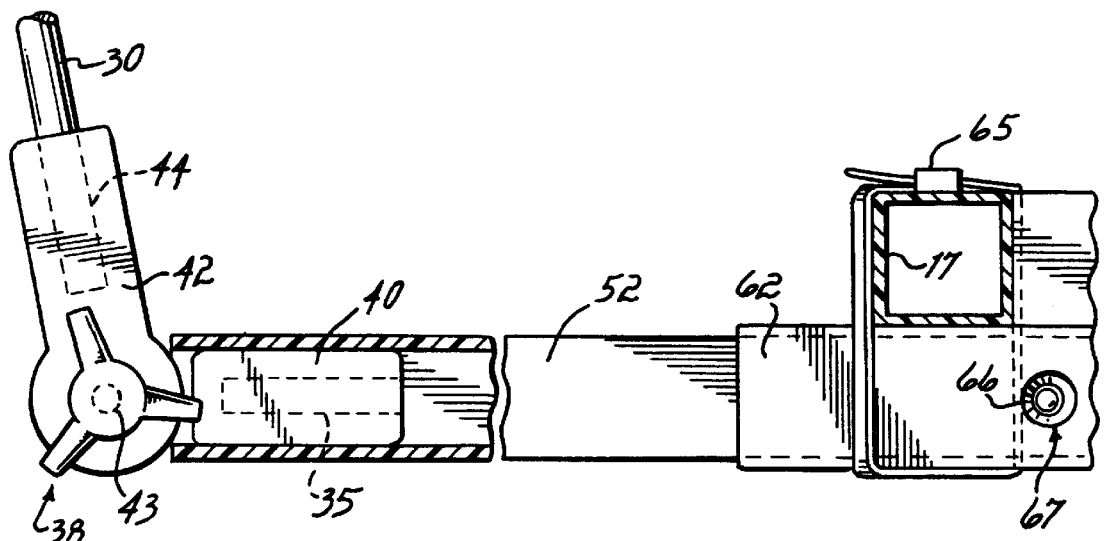
FIG. 4 is a cross-sectional view taken along line 4—4 of FIG. 3.

The transverse support beam 62 includes side extension arms 52 that are telescopically received within respective opposing ends of the transverse support beam 62. In the preferred embodiment, each side extension arm 52 is constructed of thin-walled polymer tubing with a square cross-section and is slidably received within the interior of one opposing end of the transverse support beam 62. As best seen in FIG. 4, each side extension arm 52 includes a spring-loaded plunger 66 that removably extends through an opening 67 through one wall of the transverse structural beam 62. Multiple openings 67 can be provided so the length of beam 62 can be effectively adjusted, thereby varying the separation of concealment panels 20 at their rear edges.

FIG. 4 also shows one of several removable flexible cable ties 65 used in the preferred embodiment to attach the portable hunting blind 10 to a support member 17 of a tree stand 14. Any suitable fastener can be used to mount the blind to a tree stand, including u-bolts, screws, wire, cable, detachable connectors, bayonet or twist-type fittings or any other form or type of fastener or connector. An elbow 38 is attached at the distal end of each side extension arm 52 and generally includes a mounting member 40 and a socketed member 42 having an axial cavity 44. In the preferred embodiment, the socketed member 42 is pivotably connected to the mounting member 40. An end of a support rod 30 slidably fits within the axial cavity 44 of the socketed member 42.

Figure 5:
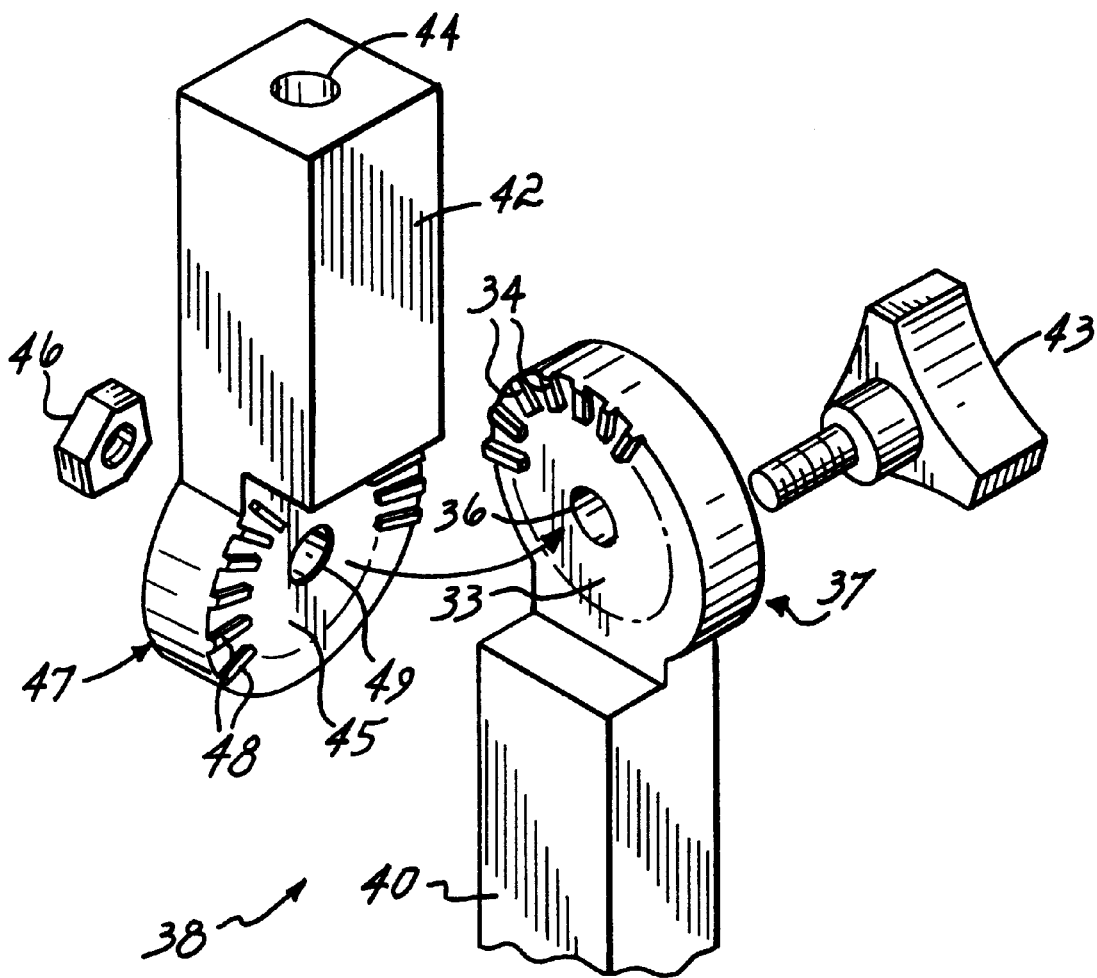
FIG. 5 is an exploded perspective view of the adjustable elbow.

An exploded view of the elbow 38 is shown in FIG. 5. At the free end of the mounting member 40 is a round head 37 having at least one preferably flat surface 33, a central bore 36, and a plurality of protruding, radially-extending projections or ridges 34 disposed annularly about the periphery of the round head 37. At the free end of the socketed member 42 is a complementary round head 47 having at least one preferably flat surface 45, a central bore 49, and a plurality of protruding, radially-extending projections or ridges 48 disposed about the flat surface 45 of the round head 45. When the elbow 38 is assembled, the flat surface 45 of the socketed member 42 frictionally rotates against the flat surface 33 of the mounting member 40. When interlocked by lateral applied force, the ridges 34, 48 on the two respective flat surfaces 33, 45 interlock to prevent further rotation of the elbow 38 and any attached concealment panel 20 beyond that angular position selected by the occupant of the portable hunting blind 10. To apply a lateral force, a finger-adjustable wing bolt or fastener 43 removably fastens the mounting member 40 and the socketed member 42 by extending through the aligned central bores 36, 49. A threaded hex nut 46 is mounted in a recess coaxial with the central bore 49 of the socketed member 42 and receives the threaded portion of the wing bolt 43. Surfaces 33, 45 could be other than flat; for example, the two surfaces 33, 45 could be convex and concave, respectively, or vice-versa.

A front extension arm 50 is attached to the longitudinal support beam 60 as shown in FIG. 3. In the preferred embodiment, the front extension arm 50 is constructed of thin-walled polymer tubing with a square cross-section and is slidably received within the inner diameter of the front support beam 60. To lock the front extension arm 50 in its working position, a spring loaded plunger (not shown but similar to spring-loaded plunger 66) engages an opening (not shown but similar to opening 67) in a side wall of the front support beam 60.

A cross-beam 54 is telescopically mounted on the front extension arm 50. The cross-beam 54 includes a transverse strut 55 having opposing ends and a longitudinal strut 57. Each opposing end of the transverse strut 55 comprises an integral mounting member 39, similar to the mounting member 40 of elbow 38 (FIG. 5) as a seamless part of the transverse strut 55. The longitudinal strut 57 has a cross-sectional area and profile that can be telescopically received within the interior of the front extension arm 50.

A socketed member 42a, similar to the socketed member 42 of elbow 38 (FIG. 5), is pivotably attached to each end of strut 55 in the same manner as socketed member 42 is attached to mounting member 40 of FIG. 5. The socketed member 42a, slidably receives an end of a support rod 30. Accordingly, the socketed members 42a each form an elbow with a respective end of strut 55.

A gear pouch 80, as shown in FIG. 3, generally comprises a flat container 81 and a fastener to attach the container 81 to a concealment panel 20. In the preferred embodiment, the container 81 is composed of a mesh fabric and has fabric loops 88 disposed about the perimeter. A nylon cord 84, with a hook 82 at one end, is threaded through a spring-loaded clamp 86, a loop 88, and back through the spring loaded clamp 86. To attach to a concealment panel 20, the hook 82 grasps a support rod 30.

Figure 6:
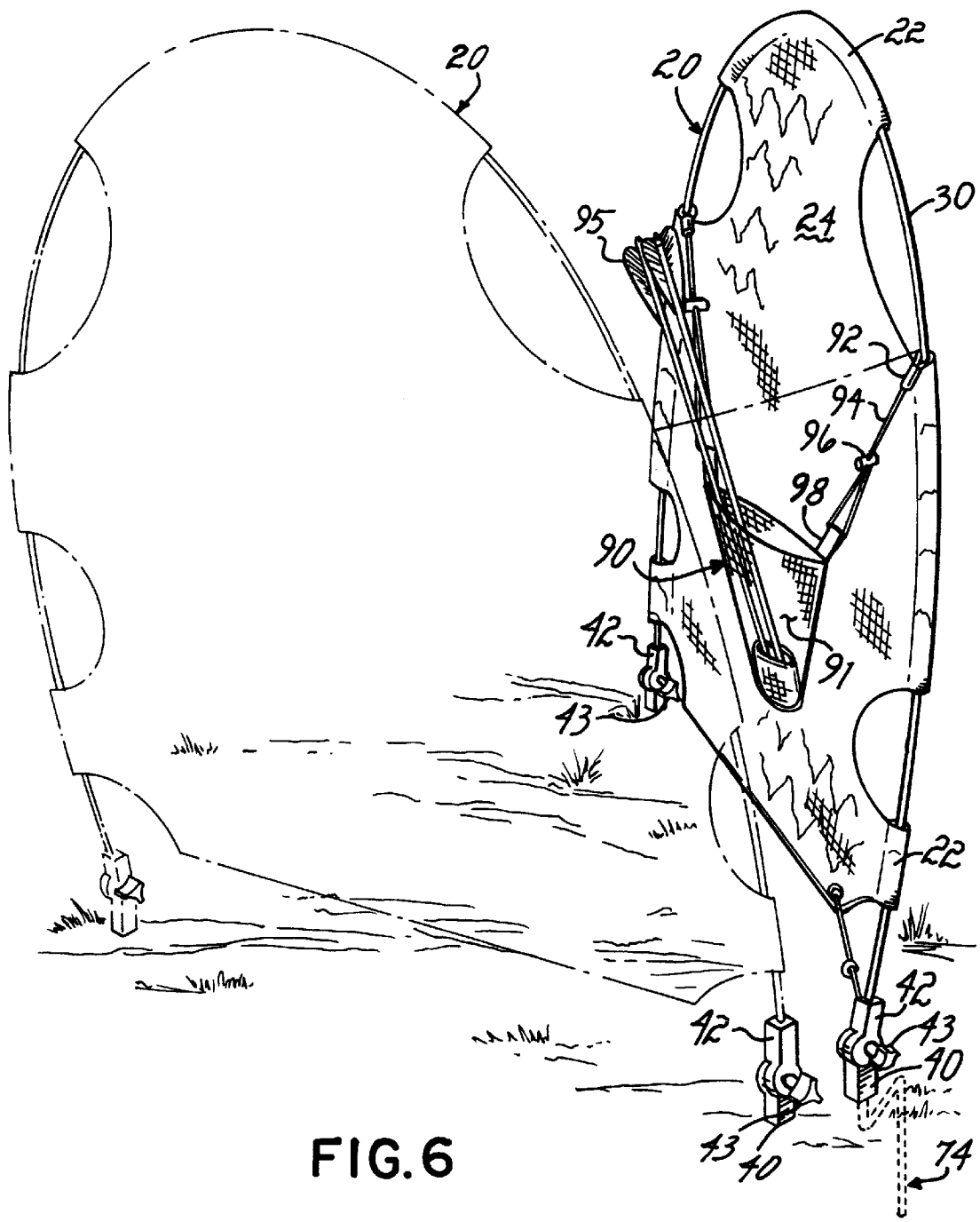
FIG. 6 is a perspective view of an alternative embodiment of the present invention in which the hunting blind has been converted into a ground blind using an optional ground stake.
Figure 8:
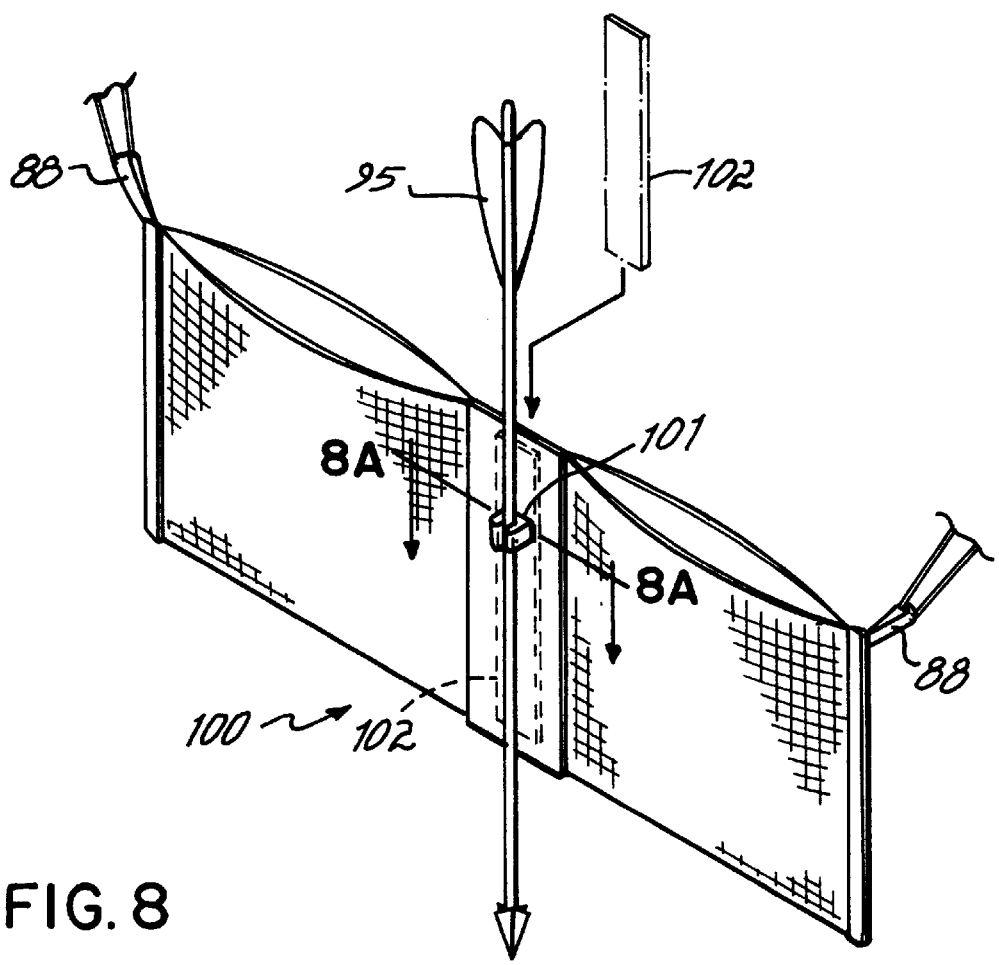
FIG. 8 is a perspective view of a gear pouch with an arrow dip according to the invention.
Figure 8A:
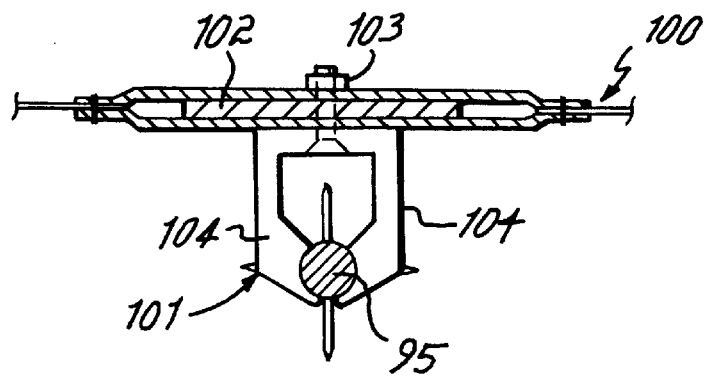
FIG. 8A is a cross-sectional view taken along lines 8A—8A of FIG. 8.

As depicted in FIG. 6, an arrow quiver 90 generally comprises a flat container 91 and a fastener to attach the container 91 to a concealment panel 20. In the preferred embodiment, the container 91 is composed of a mesh fabric and has fabric loops 98 disposed about the perimeter. A nylon cord 94, with a hook 92 at one end, is threaded through a spring-loaded clamp 96, a loop 98, and back through the spring loaded clamp 96. To attach to a concealment panel 20, the hook 92 grasps a support rod 30. Inside the flat container 91 is an arrowhead insert 93 that receives the sharp blades of stored hunting arrows 95.

In an alternative, and in place of the quiver 90, a pouch 100, similar to gear pouch 80, but outfitted with a single or multiple arrow clip 101 is used. In this regard, a stiffener 102 is sewn into a pouch 100 and a flexible arrow clip 101 is fastened with a fastener 103 onto the pouch 100 and onto or proximate to the stiffener 102. The shaft of the arrow 95 is snapped into and between the flexible arms 104 of the clip 101 and is quickly removable for a follow-up shot.

Figure 7:
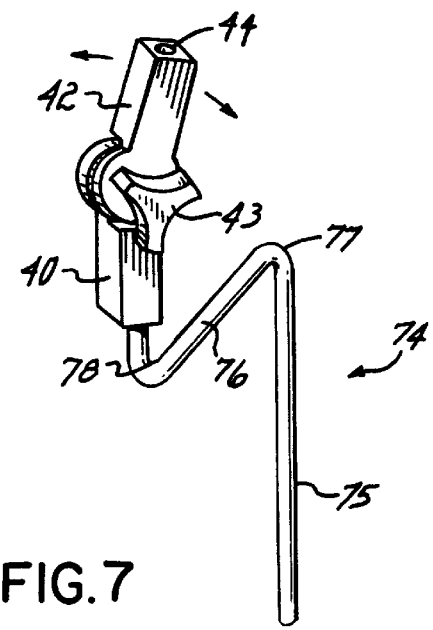
FIG. 7 is an enlarged illustration of the ground stake and mounting member of FIG. 6.

As depicted in FIG. 6, a concealment panel 20 is converted from use as a tree blind to use as a ground blind by substituting ground stakes 74 for the support base 61. In the preferred embodiment, the ground stake 74 is a length of metal rod bent into a Z-shape. An offset segment 76 offsets the ground penetration segment 75 from the socket attachment segment 78 and provides a step point 77. Force is applied to the step point 77 to drive the ground penetration segment 75 into the earth. The socket attachment segment 78 is slidably received by an axial cavity 44 in the mounting member 40. While the mounting member 40 is mechanically fixed, the socketed member 42 can rotate (as indicated in FIG. 7) in a plane containing the mounting member 40.

It will accordingly be appreciated that a preferred blind according to the invention comprises a support base and two preferably arch-shaped panels mounted thereon where the panels are preferably adjustably disposed with their rear edges further apart than their front edges. This accommodates a wider space for a hunter between the panels at the rear of the space bounded by the panels and defines a narrower, upwardly diverging opening between the front edges of the panels for a shooting or observation lane without detection from the sides.

It will be appreciated that the height of the arch5 shaped panels can be varied and various heights used with various height seats in a blind to provide different degrees of concealment and cover for various hunting and observation or shooting applications. Also, as shown in FIG. 3, the cover panel sleeves 22 are discontinuous. This allows threading of only part of the panel onto the rod so that an adjacent panel part can remain limp and be folded over to reduce or change the heighth or shape of panel cover 24.

The present invention provides an improved hunting blind that can be retrofitted to most commercial tree stands or used independently as a ground blind. Due to its compact modular construction from lightweight materials, the portable hunting blind is easy to transport to the hunting site and easy to assemble in the field without tools. Individual concealment panels can be adjustably positioned to conceal the occupant from lateral detection at all times, yet afford a substantially unobstructed frontal shooting lane. Another attribute is that the camouflage covering can be simply reconfigured to match changing natural surroundings.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

Having described the invention, what is claimed is:

1. A portable hunting blind comprising:
   a support base removably securable to a tree stand and having a front portion and a rear portion,
   at least two pivoting elbows, each said elbow disposed in a spaced relation on the support base,
   an arch-shaped support rod having two opposing ends, wherein each opposing rod end is removably attached to one of said elbows,
   a panel cover removably attached to said support rod and spanning an area defined in part by said arch-shaped rod, and means for connecting the blind to a tree stand.

2. The portable hunting blind of claim 1, including at least four elbows disposed in spaced relation on said base, at least two arch-shaped support rods with opposing ends, each rod end mounted in an elbow and at least one panel cover on each rod wherein each panel has a front edge proximate a front edge of the other panel and a rear edge, and wherein the panels are disposed apart a wider distance at their rear edges at the rear portion of the support base than the forward proximate edges of the panels at the front portion of the base.

3. The portable hunting blind of claim 2 wherein the elbows are pivoted so that said panels define an upwardly diverging opening at the front portion of the blind.

4. A portable hunting blind for use in combination with a tree stand comprising:
   a support base removably securable to a tree stand,
   at least two pivoting elbows, each said elbow attached in a spaced relation to the support base,
   an arch-shaped support rod having two opposing ends, wherein each opposing rod end is removably attached to one of said elbows,
   a panel cover removably attached to said support rod, and spanning across an area defined in part by said arch-shaped rod, and
   means for connecting the blind to a tree stand.

5. The portable hunting blind of claim 4 wherein each support rod comprises a plurality of flexible tubular members, said tubular members being joined with a shock cord.

6. The portable hunting blind of claim 5 wherein each tubular member is composed of a polymer.

7. The portable hunting blind of claim 4 wherein the support base comprises at least two interconnected support beams.

8. The portable hunting blind of claim 7 wherein the support base comprises a transverse support beam having a medial region and opposing ends and a longitudinal support beam having opposed ends, one said opposing end of the longitudinal support beam fastened to the medial region of the transverse support beam.

9. The portable hunting blind of claim 8 further comprising no more than three extension arms, each said extension arm telescopically received within the free end of one support beam.

10. The portable hunting blind of claim 4 wherein each elbow comprises a mounting member having a distal end with a coupling surface, a socketed member having a distal end with a facing coupling surface, and a fastener, said distal end of said socketed member adjustably fastened by said fasteners to the distal end of said mounting member.

11. The portable hunting blind of claim 10 wherein the coupling surface on the mounting member and the coupling surface on the socketed member each include raised ridges disposed about the respective surfaces.

12. The portable hunting blind of claim 10 wherein each socketed member defines an axial cavity therein and opposing end of the support rod is slideably received within the axial cavity of one socketed member.

13. The portable hunting blind of claim 4 wherein the panel cover is composed of a fabric material incorporating a camouflage pattern.

14. The portable hunting blind of claim 4 further comprising a front skirt, said front skirt comprising a fabric sheet having a camouflage pattern and a fastener, said sheet removably fastened to each concealment panel.

* * * * *